US006769714B2

(12) United States Patent
Hosey et al.

(10) Patent No.: US 6,769,714 B2
(45) Date of Patent: Aug. 3, 2004

(54) LOW ONSET DUAL STAGE HYBRID INFLATOR

(75) Inventors: Edward O. Hosey, Lakeland, FL (US); Keith Lam, Lakeland, FL (US); John Adams, Lakeland, FL (US); Don Burroughs, Lakeland, FL (US); Russell Watrous, Land O Lakes, FL (US); Michael Eugene Kelley, Valrico, FL (US)

(73) Assignee: Key Safety Systems, Inc., Sterling Heights, MI (US)

( * ) Notice: Subject to any disclaimer, the term of this patent is extended or adjusted under 35 U.S.C. 154(b) by 27 days.

(21) Appl. No.: 10/167,489

(22) Filed: Jun. 13, 2002

(65) Prior Publication Data

US 2003/0230881 A1 Dec. 18, 2003

(51) Int. Cl.[7] ............................................. B60R 21/26
(52) U.S. Cl. ........................................................ 280/737
(58) Field of Search ................................ 280/736, 737, 280/741

(56) References Cited

U.S. PATENT DOCUMENTS

| | | | |
|---|---|---|---|
| 5,016,914 A | | 5/1991 | Faigle et al. ................ 280/741 |
| 5,022,674 A | * | 6/1991 | Frantom et al. ............ 280/741 |
| 5,351,988 A | * | 10/1994 | Bishop et al. ............... 280/737 |
| 5,577,769 A | | 11/1996 | DiGiacomo et al. ........ 280/736 |
| 5,890,735 A | * | 4/1999 | Smith .......................... 280/737 |
| 6,168,200 B1 | | 1/2001 | Greist, III et al. .......... 280/736 |
| 6,189,922 B1 | | 2/2001 | Parks et al. ................. 280/735 |
| 6,382,668 B1 | * | 5/2002 | Goetz .......................... 280/737 |
| 6,629,703 B2 | * | 10/2003 | Horton et al. ............... 280/737 |

* cited by examiner

Primary Examiner—Thomas Price
(74) Attorney, Agent, or Firm—Jarett Rieger

(57) ABSTRACT

A low onset dual stage hybrid inflator comprising a diffuser subassembly, a gas generator subassembly, and a pressure vessel. The dual stage inflator offers a variety of different output levels of inflation gas. The four main deployment scenarios for the dual stage inflator are primary output, staged output, full output, and secondary only. For primary output, only the stored gas is released from the inflator. For staged output, the stored gas is released and after a short period of time (i.e. 30 ms), the gas generant is ignited. For the full output, the stored gas is released from the dual stage inflator at the same time the gas generant is ignited. For secondary output, only the gas generant subassembly is fired, and the hot gases from the gas generant subassembly mix with the stored gas. The combination of the hot gas and the stored gas has sufficient pressure to rupture the burst disk.

11 Claims, 5 Drawing Sheets

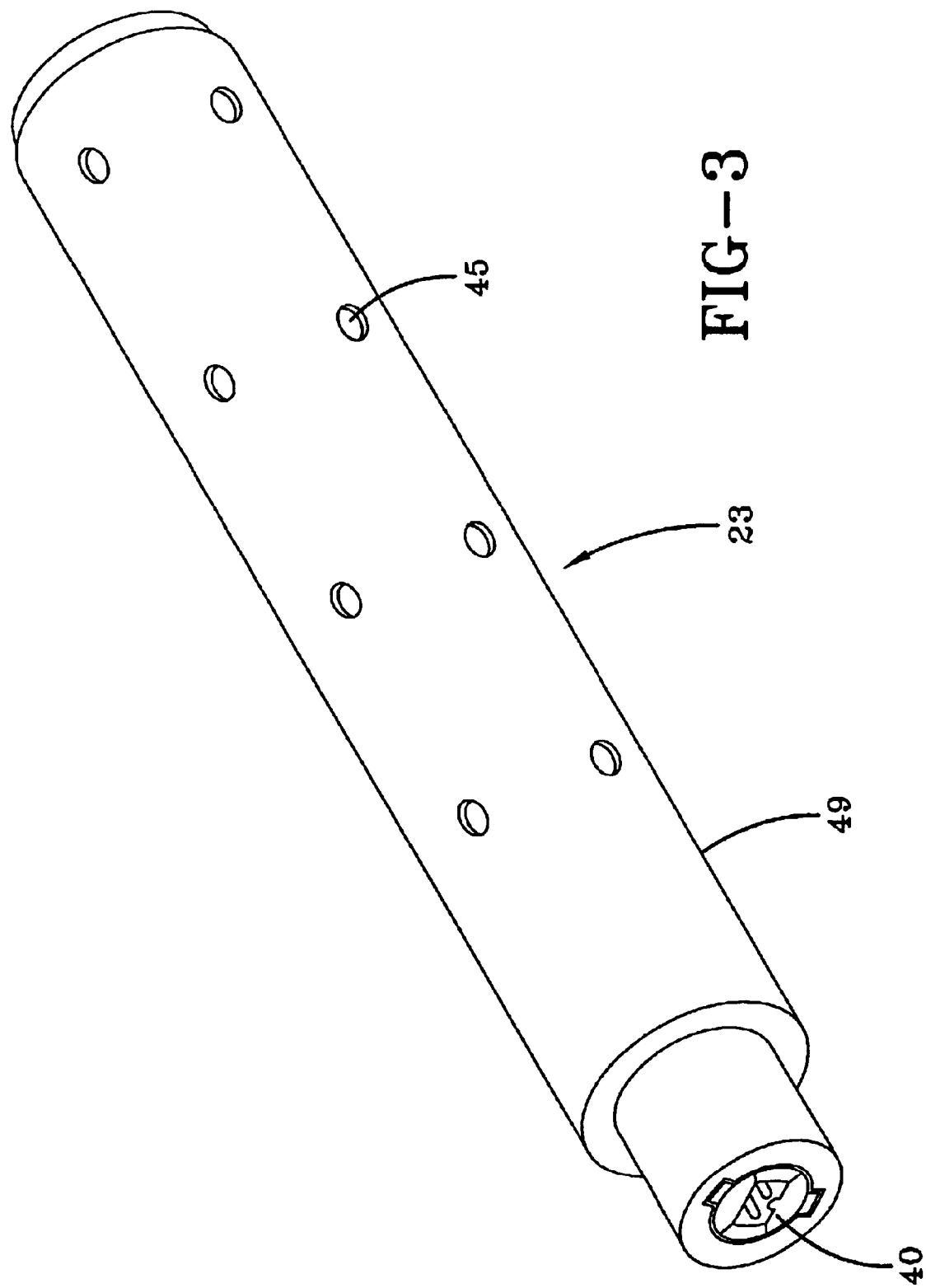

LOW ONSET DUAL STAGE HYBRID INFLATOR

FIELD OF THE INVENTION

The present invention relates generally to an inflation device and more specifically to a dual stage inflator capable of providing various levels of inflation gas. The invention is specifically designed to achieve a low inflation onset to not injure an occupant, especially a child or a small adult.

BACKGROUND OF THE INVENTION

Inflatable restraints or airbags have been shown to reduce the seriousness of occupant injury during an automobile crash. An airbag, filled with inflation gas, provides a cushion between a vehicle occupant and the instrument panel or steering wheel. The likelihood of injury is minimized by the airbag absorbing some or all of the kinetic energy associated with the occupant during a crash.

An inflator provides the inflation gas utilized to inflate an airbag. Inflators generally provide inflation gas by burning a pyrotechnic material, releasing stored gas, or by some combination thereof. During a crash, the inflator is actuated to rapidly inflate an airbag. The aggressive airbag deployment has the advantage of getting the inflated airbag in front of the vehicle occupant as soon as possible. The problem associated with aggressive airbag deployment is the possibility of a child, a small adult, or an out of position adult interacting with the airbag while it is being inflated. Out of position is a phrase utilized in the safety restraint industry that refers to an occupant that is not sifting properly in his/her seat or sitting too close to the airbag module.

Dual stage inflators have been developed to reduce the injury to small adults or children by reducing the aggressiveness of airbag deployment. These inflators provide varying output levels of inflation gas in accordance with the size and position of the occupant. The dual stage inflators are able to provide a full output of inflation gas to protect a full size occupant who is not out of position. The dual stage inflator is also able to provide a staged output of inflation gas for the occupants who are smaller is size or out of position. The staged output deployment operates by providing a portion of inflation gas to partially inflate the airbag and after a period of time, the inflator provides more inflation gas to fill the airbag.

Inflators with varying output levels of inflation gas or dual stage inflators have been shown in the past. The dual stage inflators shown in U.S. Pat. No. 6,189,922 B1 and U.S. Pat. No. 6,168,200 B1 have a first and second gas generant. Another variation of the dual stage inflator has two separate burst disks which is illustrated in U.S. Pat. No. 5,022,674, U.S. Pat. No. 5,351,988, and U.S. Pat. No. 5,016,914.

SUMMARY OF THE INVENTION

In accordance with the present invention, a low onset dual stage hybrid inflator is disclosed for use in a vehicle. The dual stage inflator comprises a diffuser subassembly, a gas generator subassembly, and a pressure vessel. The diffuser subassembly has a burst disk and an opening device and upon actuation of the opening device, the opening device produces an output energy, which ruptures the burst disk and allows stored gas to escape the dual stage inflator through a flow control discharge opening in the burst disk.

The gas generator subassembly comprises an igniter and a gas generant surrounded by a gas generant subassembly housing. Upon actuation of the igniter, the gas generant is ignited which produces heat and gas that exits the gas generant subassembly housing through a plurality of apertures and enters the pressure vessel containing the stored gas.

The present invention has various output levels associated therewith. For instance, the dual stage inflator can release only the stored gas. The inflator has the option for staged deployment whereby the stored gas is released and after a finite amount of time, the gas generant is ignited. Also, the inflator has the means for full output whereby the burst disk is ruptured at the same time the gas generator subassembly is fired. Another deployment scenario is the firing of the gas generator subassembly only.

In one embodiment of the present invention, the diffuser subassembly and the gas generator subassembly are situated on opposite ends of the dual stage inflator. In another embodiment, the diffuser subassembly and the gas generator subassembly are situated on the same end of the dual stage inflator.

BRIEF DESCRIPTION OF THE DRAWINGS

FIG. 3 shows a perspective view of the gas generator subassembly.

DETAILED DESCRIPTION OF THE INVENTION

Figure 1:
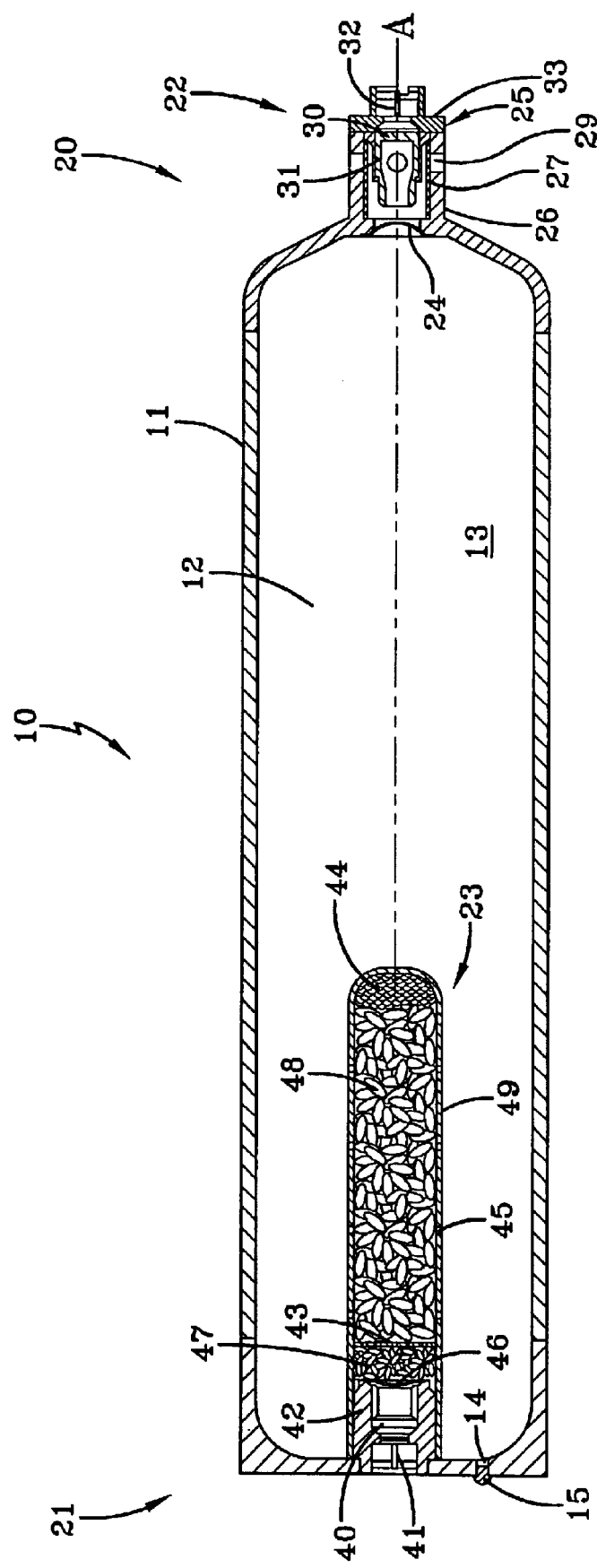
FIG. 1 shows a cross sectional view of the dual stage inflator in the present invention.

The present invention provides a dual stage inflator 10 able to gently inflate an automotive airbag so as not to injure an out of position child or small adult while still being capable of providing crash protection to a full size adult. The dual stage inflator 10 provides various output levels of inflation gas for inflating an airbag usable within a vehicle occupant restraint safety system. The dual stage inflator 10 comprises an outer housing 11 forming a pressure vessel 12 that is filled with stored gas 13, which is released from the inflator during an automobile crash to inflate a vehicle airbag. The dual stage inflator 10 has a generally cylindrical shape and may be formed of stainless steel, low carbon steel, or any other suitable material, which has sufficient strength and extremely low gas permeability.

The ideal characteristics for the stored gas 13 are that the gas is inert, is not highly temperature sensitive, and has a high inflation rate. The stored gas 13 can include one or more gases, which include but is not limited to argon, carbon dioxide, oxygen, helium, and nitrogen.

The pressure vessel 12 is filled with stored gas 13 through the gas fill port 14, which can be located on either end of the dual stage inflator 10. The gas fill port 14 is sealed by a plug 15 made from low carbon steel to prevent gas from escaping after the dual stage inflator 10 has been filled to the desired pressure. It is preferred that the plug 15 is secured to the gas fill port 14 by a resistance weld, but one skilled in the art realizes that other types of welding could be utilized to fuse the plug 15 to the outer housing 11.

As shown in FIG. 1, the dual stage inflator 10 has a first end 20 having a diffuser subassembly 22 and a second end 21 having a gas generator assembly 23. The diffuser subassembly 22 comprises a burst disk 24, a diffuser 26, and an opening device 25. Actuation of the opening device 25 results in the rupturing of the burst disk 24 resulting in the stored gas 13 exiting the dual stage inflator 10 through the diffuser subassembly 22.

Figure 2A:
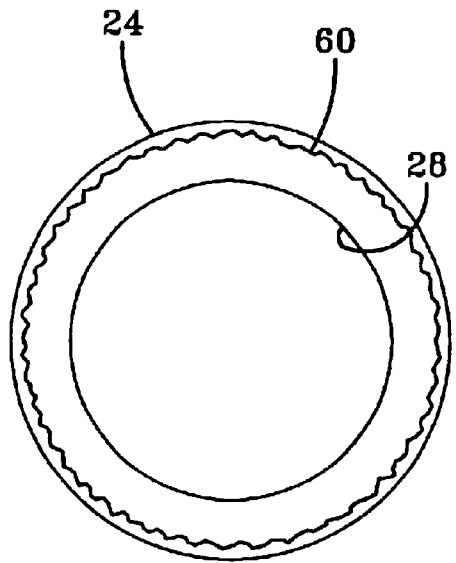
FIGS. 2A, 2B, 2C, and 2D show various burst disk configurations.
Figure 2B:
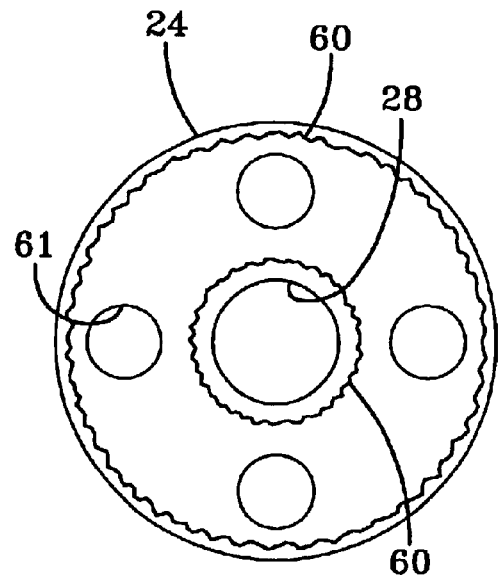
Figure 2C:
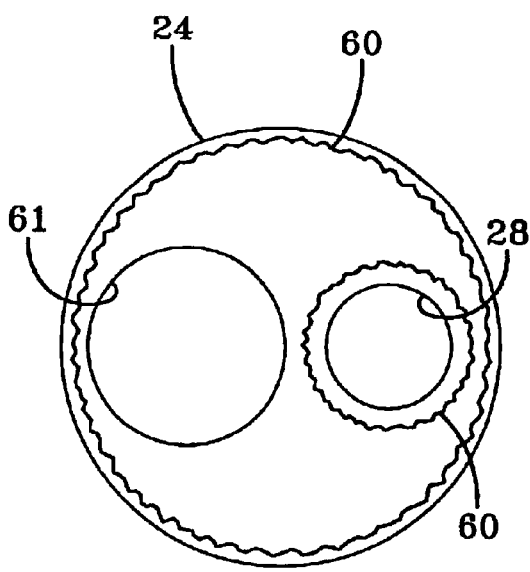
Figure 2D:
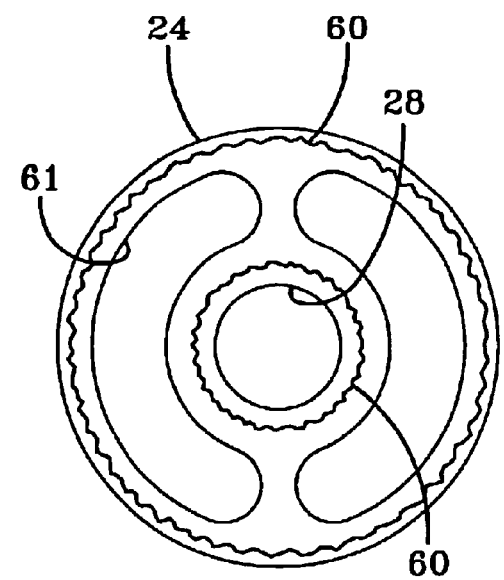

The burst disk 24 is attached to the legs of the diffuser 26 and seals the diffuser 26 so that stored gas 13 can not exit the dual stage inflator 10. The burst disk 24 can be seen in FIG. 2A and is made from stainless steel, inconel material, monel material, or any other suitable material that allows the burst disk 24 to open reliably at −40° C. The hardness of the burst disk 24 should be between "half hard" and "full hard" to minimize burst disk 24 thickness. Hardness is the degree to which a metal will resist cutting, abrasion, penetration, bending and stretching. The indicated hardness of metals will differ somewhat with the specific apparatus and technique of measuring. The outer portion of the burst disk 24 is attached to the diffuser 26 by a laser weld 60 but could be attached by other welding techniques. The inner portion of the burst disk 24 is not attached to any portion of the diffuser 26 and bulges upon filling of the pressure vessel 12. The burst disk 24 adopts a dome shape configuration due to the force of the stored gas 13 being applied to the burst disk 24. Alternatively, the burst disk 24 can be bulged in the direction of the opening device 25 by a hydro-forming process after the burst disk 24 is attached to the diffuser 26. Upon actuation of the igniter 30, the burst disk 24 ruptures resulting in a discharge opening 28, which allows the stored gas 13 to flow into the diffuser 26 and out of the dual stage inflator 10. It is appreciated that the burst disk 24 can have one or more secondary discharge openings 61 to control the internal pressure of the pressure vessel 12. FIGS. 2B–2D illustrate various burst disk configurations having one discharge opening 28 and at least one secondary discharge opening 61. The actuation of the igniter 30 from the diffuser subassembly 22 ruptures the burst disk 24 so there is one discharge opening 28. If the gas generant subassembly 23 (described in detail below) is actuated at the same time or before the diffuser subassembly 22 is fired, than the internal pressure of the pressure vessel 12 will increase and rupture the burst disk in such a way that one or more secondary discharge opening(s) 61 are created.

The opening device 25 is attached to a diffuser, which is connected to the outer housing 11, and the opening device 25 is positioned within 8.0 mm away from the center of the burst disk 24. The diffuser 26 may be formed of stainless steel, low carbon steel, or any other suitable material having sufficient structural strength and extremely low gas permeability. The diffuser 26 is connected to the cylindrical vessel by a circumferential weld, preferably a friction weld, but other suitable welding techniques may be employed. The diffuser 26 has a plurality of outlet ports 29 along the circumference of the diffuser 26 for directing gas flow out of the dual stage inflator 10 in a radial direction whereby the diffuser subassembly 22 is thrust neutral during release of the inflation gas. Upon rupture of the burst disk 24, the stored gas 13 travels through the diffuser 26 and ultimately travels through the outlet ports 29. The stored gas 13 carry burst disk 24 fragments from the ruptured burst disk 24 and these fragments are caught by a screen 27 to prevent them from exiting the dual stage inflator 10. The discharge opening 28 and the secondary discharge opening(s) 61 of the burst disk 24 control the flow rate of the stored gas; thus, the inflator 10 is "choked" at the discharge opening 28 and not at the outlet ports 29.

The opening device 25 comprises an electrically actuated igniter, an end cap 33, and optionally an igniter nozzle 31. The opening device 25 is positioned so that the longitudinal axis of the opening device 25 is essentially parallel with a longitudinal axis A of the dual stage inflator 10. The igniter 30 communicates with a controller (not shown) via two or more electrodes, which in turn communicates with a sensor means (not shown). The igniter 30 is an electrical device which initiates the deployment of the inflator when a suitable electric current is passed through an ignition resistor embedded in one or more layers of pyrotechnic compositions. The igniter may be of the standard direct fire design, receiving the firing current directly from the controller, or the igniter 30 may be of an advanced design which communicates with the controller by digital signals and which contains on board the igniter an ASIC (application specific integrated circuit), firing capacitor, and related components. The pyrotechnic compositions and load weight contained within the igniter are designed to generate an output energy that will reliably rupture the burst disk 24. An example of a suitable pyrotechnic composition or ignition material for the present invention is zirconium potassium perchlorate or ZPP, however, one skilled in the art realizes that other ignition materials could be used in the present invention.

An end cap 33 is a metal member that houses the igniter 30. It is appreciated that the end cap 33 may also be made from a plastic material made from an injection molding process. The end cap 33 as seen in FIG. 1 has threads, which are utilized for the purpose of attachment to an airbag module (not shown).

The opening device 25 may also comprise an igniter nozzle 31 for directing an output energy from the ignition of the ignition material towards the burst disk 24. The nozzle is tapered inward in the direction of the burst disk 24. Without the igniter nozzle 31, the igniter 30 would still rupture the burst disk 24 but will need to be loaded with extra ignition material to provide consistent opening at −40° C. It is also possible to utilize an igniter 30 with reinforced walls, which would eliminate the need for a nozzle 31. These reinforcement walls would act in a similar fashion to the nozzle 31 by focusing the output energy in the direction of the burst disk 24.

With reference to FIG. 1, the gas generator subassembly 23 is situated on a second end 21 of the inflator as the diffuser subassembly 22. The gas generator subassembly 23 has an igniter 40 for receiving an electrical signal from a controller (not shown) via two or more electrodes 41 which in turn communicate with a sensor means (not shown). The igniter 30 is an electrical device which initiates the deployment of the inflator when a suitable electric current is passed through an ignition resistor embedded in one or more layers of pyrotechnic compositions. The igniter may be of the standard direct fire design, receiving the firing current directly from the controller, or the igniter 30 may be of an advanced design which communicates with the controller by digital signals and which contains on board the igniter an ASIC (application specific integrated circuit), firing capacitor, and related components.

The pyrotechnic compositions and load weight contained within the igniter 40 are designed to break through the gas tight sealing disk 46 and fully ignite the enhancer 47. An example of a suitable pyrotechnic composition or ignition material for the present invention is zirconium potassium perchlorate, however, one skilled in the art realizes that other ignition materials can be utilized in the present invention. The igniter 40 is encased in an igniter housing 42, which is attached to the outer housing 11.

The enhancer 47 may be any of a number of known compositions that are readily ignited by the igniter 40 and burn at a high rate and temperature. Examples of enhancers include boron potassium nitrate and non-azide formulations containing a metal. The gases and hot burning particles from the ignited enhancer 47 exit through the pellet retainer 43 and ignite the gas generant 48. The gas generator subassembly 23 has a cushion 44 located on the end furthest away from the enhancer 47. The cushion 44 is a resilient member that is utilized to bias the gas generant 48 against the pellet retainer 43 to ensure the gas generant 48 pellets occupy a predetermined volume without being able to rattle. The pellet retainer 43 is a porous wall that divides the enhancer 47 from the gas generant 48. The hot gases from the ignition of the enhancer 47 can flow through the pellet retainer 43 but neither the enhancer 47 material nor the gas generant 48 pellets can pass through the pellet retainer 43.

Representative gas generant 48 compositions useful in the dual stage inflator 10 include fuels such as aminotetrazoles, tetrazoles, bitetrazoles, triazoles, the metal salts thereof, nitroguanidines, guanidine nitrate, amino guanidine nitrate, and mixtures thereof; in combination with an oxidizer such as the alkali and alkaline earth metal nitrates, chlorates, perchlorates, ammonium nitrate, and mixtures thereof. The gas generant 48 can be formed into various shapes using various techniques known to those skilled in the art.

The gas generant subassembly housing 49 retains the gas generant 48 and is made from stainless steel, low carbon steel, or other suitable material. The gas generant subassembly housing 49 has a plurality of apertures 45, which can be seen in FIG. 3. The plurality of apertures 45 are situated along the length of the gas generant subassembly housing 49, and an important facet about the size and number of apertures 45 is that the gas generator subassembly 23 remains thrust neutral during the burning of the gas generant 48. Importantly, the apertures 45 directly expose the gas generant 48 in the gas generator subassembly 23 to the conditions present in the pressure vessel 12. Moreover, the location of the apertures 45 allows the hot gases to be discharged on the walls of the outer housing 11 thus cooling and retaining solid particulates preventing a portion of the particulates from entering the diffuser subassembly 22. When the pressure vessel 12 is filled with stored gas 13, some of the stored gas 13 is able to flow into the gas generator subassembly 23 equalizing the pressure in the pressure vessel 12 with the gas generant subassembly 23. A sealing disk 46 is utilized in the present invention to prevent the stored gas 13 from escaping from the dual stage inflator 10 through the gas generator subassembly 23. The sealing disk 46 is attached by laser welding to the igniter housing 42, but could be attached by other welding techniques.

Figure 4:
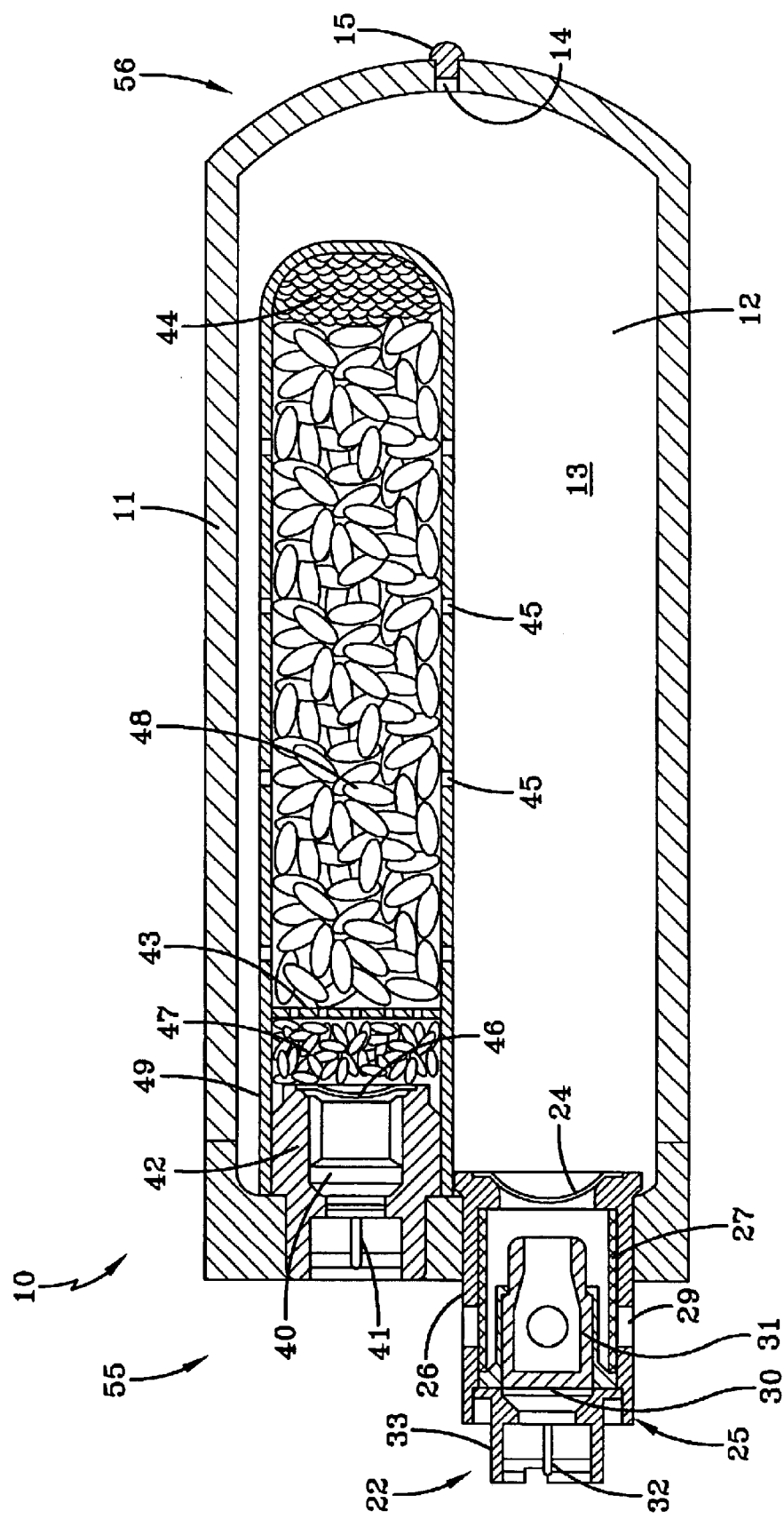
FIG. 4 shows a cross sectional view of a second embodiment for the dual stage inflator in the present invention.

The dual stage inflator 10 in FIG. 4 has a different configuration whereby the diffuser subassembly 22 and the gas generator subassembly 23 are disposed on a first end 55 of the dual stage inflator 10. For this embodiment the diffuser subassembly 22 and the gas generator subassembly 23 contain the same components as described above. The fill port 14 can be situated on the first end 55 or the second end 56 of the dual stage inflator 10.

Figure 5:
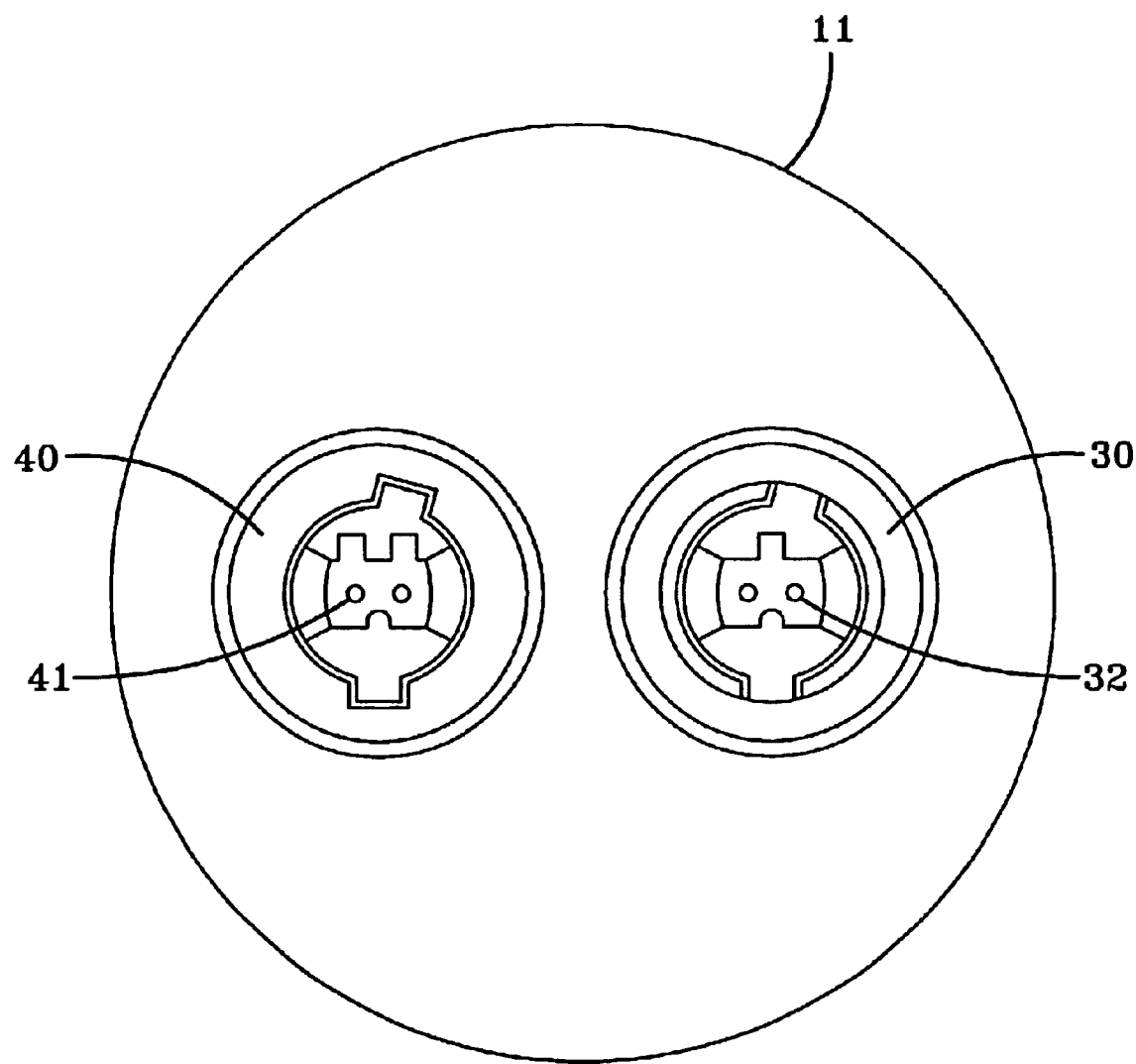
FIG. 5 shows a view of a first end of the dual stage inflator shown in FIG. 4.

With reference to FIG. 5, an end view of the embodiment in FIG. 4 shows the igniters 30 & 40 of the dual stage inflator 10.

The dual stage inflator 10 according to the present invention offers great flexibility in the output levels of inflation gas. As can be appreciated, the airbag (not shown) is mounted in an airbag module with an inflator so that the airbag can receive inflation gas from the inflator. The dual stage inflator 10 is activated by a crash sensor (not shown) and a controller (not shown). The preferred crash sensors are of the type that can discern between different levels of deceleration to determine the severity of the crash. The automobile can also be equipped with other type of sensors sensing the size and position of the occupant(s). The crash sensors communicate with the controller, which processes the data signals form the sensors to determine the severity of the crash and the size and position of the occupant. At the onset of a crash, the controller communicates with the igniter 40 of the gas generator subassembly 23 and with the igniter 30 of the diffuser subassembly 22.

There are four deployment scenarios anticipated by the present invention. The first deployment scenario, a primary only output, involves the release of the stored gas 13 by the rupturing of the burst disk 24. Only the stored gas 13 is used in this scenario and may be useful for low speed crashes involving child occupants. The gas generator subassembly 23 would be actuated in a timely fashion but after the crash to eliminate the pyrotechnic material from the dual stage inflator 10. The firing of the gas generator subassembly 23 is for safety purposes to prevent inadvertent ignition and injury to occupants.

The second deployment scenario, a staged output, involves the actuation of the gas generator subassembly 23 after a short delay after the rupturing of the burst disk 24. The delay can be set up to be between 15–30 milliseconds but it is appreciated that shorter or longer delays could be employed. The staged output is used for positioning the occupant, primarily a child or small adult, for a crash. The ignition of the gas generant 48 would produce heat resulting in the stored gas 13 escaping the vessel quicker and would produce gas which would be added to the stored gas 13 to increase the moles of gas produced by the dual stage inflator 10.

A third deployment scenario, or full output, is contemplated by the present invention wherein both stages of the dual stage inflator 10 are initiated at the same time. This provides a large volume of gas from the inflator at a high rate and may be used for high speed crashes or larger adult occupants.

A fourth deployment scenario is the actuation of the gas generant subassembly 23 only. During this secondary deployment scenario, the gas generant 48 is ignited which produces hot gas, and this hot gas mixes with the stored gas 13 in the pressure vessel 12. The pressure of the stored gas climbs quickly and applies enough pressure of the burst disk 24 to rupture it. This fourth deployment scenario arrives at Pmax the quickest.

Many changes and modification in the above-described embodiments of the invention can, of course, be carried out without departing from the scope thereof. Accordingly, that scope is intended to be limited only by the scope of the appended claims.

We claim:

1. An inflator for an airbag comprising:

(a) an outer housing forming a pressure vessel for storing inert gas having first and second ends;

(b) a diffuser subassembly disposed on the first end, the diffuser subassemblyt comprising a burst disk and an opening device which is positioned so that a longitudinal axis of the opening device is essentially parallel with a longitudinal axis of the inflator, wherein actuation of the opening device produces energy for rupturing a burst disk which creates a pathway for the inert gas to exit the inflator; and (c) a gas generator subassembly disposed on the second end, the gas generator substantially comprising a first igniter, an enhancer, a gas generant, and a gas generant subassembly housing, the gas generant subassembly housing retains the gas generant and includes a plurality of apertures whereby the gas generant is in communication with the stored gas before the gas generant is ignited wherein a sealing disk is positioned within the gas generant subassembly housing between the enhancer and the first igniter to prevent leakage of stored gas out of the inflator.

2. The inflator according to claim 1 wherein the opening device comprises a second igniter and a nozzle for focusing an output energy of the second igniter.

3. The inflator according to claim 1 wherein the diffuser subassembly has a flow means for regulating gas flow therethrough, the flow means is a discharge opening formed by the rupturing of the burst disk.

4. The inflator according to claim 1 wherein the center of the burst disk is less than 8.0 mm away from the opening device.

5. The inflator according to claim 1 wherein the gas exits the inflator in substantially a radial direction resulting an neutral thrust.

6. The inflator according to claim 1 wherein the gas generator subassembly further comprising a cushion for controlling the gas generant volume and noise abatement.

7. The inflator according to claim 1 wherein the plurality of apertures are situated along the length of the gas generant subassembly housing, wherein the apertures have a size and shape that do not allow pellets of gas generant to pass thereto, wherein the apertures are positioned to direct hot gases generated from the burning of the gas generant toward the outer housing of the pressure vessel.

8. The inflator according to claim 1 wherein the first igniter is situated inside the inflator and at least a portion of the second igniter is situated outside of the inflator.

9. The inflator according to claim 7 wherein some of the plurality of apertures are situated in closer proximity to the first igniter than a cushion, wherein some of the plurality of apertures are situated in closer proximity to the cushion than the first igniter.

10. The inflator according to claim 3 wherein the diffuser subassembly further comprises a diffuser, the diffuser has a tapering portion and an igniter portion, one end of the tapering portion of the diffuser is connected to the outer housing, the burst disk is attached to the other end of the tapering portion of the diffuser.

11. The inflator according to claim 10 wherein a plurality of outlet ports are situated along the circumference of the igniter portion of the diffuser, wherein the igniter portion of the diffuser partially receives the opening device, wherein the igniter portion has a diameter that is substantially equal to the diameter of the discharge opening.

* * * * *